United States Patent [19]

Suchenwirth et al.

[11] Patent Number: 5,618,508

[45] Date of Patent: Apr. 8, 1997

[54] PROCESS FOR PURIFYING EXHAUST GAS USING MODIFIED CALCIUM HYDROXIDE

[75] Inventors: Hermann Suchenwirth, Grafrath; Roland Fichtel, Starnberg, both of Germany

[73] Assignee: FTU GmbH Technische Entwicklung und Forschung im Umweltschutz, Starnberg, Germany

[21] Appl. No.: 193,238

[22] Filed: Feb. 8, 1994

Related U.S. Application Data

[63] Continuation of Ser. No. 801,679, Dec. 2, 1991, Pat. No. 5,306,475, which is a continuation-in-part of Ser. No. 302,593, Jan. 13, 1989, abandoned.

[30]     Foreign Application Priority Data

| May 18, 1987 | [DE] | Germany | 37 16 566.6 |
| May 10, 1988 | [DE] | Germany | 38 15 982.1 |
| May 16, 1988 | [DE] | Germany | 38 16 595.3 |

[51] Int. Cl.$^6$ .......................................... B01J 8/00
[52] U.S. Cl. ............................. 423/245.1; 423/240 R
[58] Field of Search ........................... 423/210, 245.1, 423/240 R

[56] References Cited

U.S. PATENT DOCUMENTS

| 2,423,689 | 7/1947 | Day ........................................ 252/192 |
| 4,127,470 | 11/1978 | Baird, Jr. et al. ......................... 208/58 |
| 4,548,797 | 10/1985 | Sauer et al. ............................... 423/240 |
| 4,767,605 | 8/1988 | Lindbauer et al. ....................... 423/239 |
| 5,209,912 | 5/1993 | Suchenwirth ............................ 423/210 |
| 5,306,475 | 4/1994 | Fichtel et al. ............................. 423/210 |

FOREIGN PATENT DOCUMENTS

| 0208490 | 1/1987 | European Pat. Off. . |
| 1494785 | 7/1970 | Germany . |
| 3543530 | 10/1987 | Germany . |
| 3915934 | 11/1989 | Germany . |
| 62-216630 | 9/1987 | Japan . |
| 62-247826 | 10/1987 | Japan . |

*Primary Examiner*—Steven Bos
*Assistant Examiner*—Thomas G. Dunn Jr.
*Attorney, Agent, or Firm*—Bean, Kauffman & Spencer

[57] ABSTRACT

An enhanced calcium hydroxide, a process for its manufacture and a process for its use in the removal of volatile heavy metals from a gas is disclosed.

7 Claims, No Drawings

1

PROCESS FOR PURIFYING EXHAUST GAS USING MODIFIED CALCIUM HYDROXIDE

This is a continuation of application Ser. No. 07/801,679, filed on Dec. 2, 1991, now U.S. Pat. No. 5,306,475 which is a continuation-in-part of Ser. No. 07/302,593, filed on Jan. 13, 1989 (now abandoned).

The invention relates to a process for manufacturing reactive calcium hydroxides and their use in a process for purifying gases, particularly exhaust gases.

BACKGROUND OF THE INVENTION

Numerous processes are employed in the field of exhaust gas purification, with wet processes being generally distinguished from dry processes.

Typically, dry purification processes include the blowing of powdery calcium hydroxide into the exhaust gas stream in order to neutralize noxious acidic substances, such as sulfur dioxide, hydrogen chloride and hydrogen fluoride, so that the thus formed neutral salts can be conveniently removed by means of appropriate separating devices, such as electrostatic filters and fabric filters. Dry purification also typically includes semi-dry purification, wherein a suspension of calcium hydroxide in water, is sprayed into hot exhaust gas such that the wet calcium hydroxide is dried and reacts with substances within the gas.

The dry purification of exhaust gas is performed in numerous various industries. Primary fields of application are the purification of exhaust gases from coal and lignite power plants, refuse incinerating plants, incinerating plants for special refuse and a variety of other facilities wherein the burning of fuel materials creates pollutants.

By applying a dry exhaust gas purification process, a high percentage of noxious substances, such as for example HCL, HF and $SO_2$, can be removed from the exhaust gas. One continuing problem however, is that the process consumes significant quantities of calcium hydroxide for the amount of pollutants removed.

In general, the stoichiometric factor for calcium hydroxide use ranges from 3.5 to 6 times the stoichiometric quantities theoretically required for the amount of pollutant to be removed. In refuse incinerating plants, for example, instead of the 10 to 12 kg of calcium hydroxide estimated to be used per kilogram of exhaust gas pollutants, an amount of more than 30 kg of calcium hydroxide is generally consumed. This low efficacy of the dry exhaust gas purification process appears to be due to the fact that the individual calcium hydroxide particles do not react completely through their entire mass. A layer of reaction products appears to form on the surface of the calcium hydroxide particle, and as a result, the noxious acidic substances to be removed are prevented from penetrating further into the calcium hydroxide particle. Thus it is desirable to increase the reactivity of calcium hydroxide for use in exhaust gas treatment processes.

By an increase in the reactivity of $Ca(OH)_2$ it is meant that there is a reduction in the amount of $Ca(OH)_2$ required to achieve a specific degree of removal of the noxious acidic substances. A low stoichiometric factor of $Ca(OH)_2$ to noxious acidic substance is indicative of an increased reactivity.

Various attempts have been made in the past to reduce the calcium hydroxide consumption and increase the particulate efficiency. One means to achieve increased efficiency is to reactivate the exhausted calcium hydroxide particles, after they have been used in the purification of an exhaust gas, by mechanically reprocessing it through subjecting the particles to a grinding treatment sufficient to separate the outer unreactive layers from the inner, potentially still reactable, mass to stimulate efficiency. In another attempt to achieve increased efficiency, the reaction product is stored for one or two days, after which period it is then used again. Apparently, the stored particles reinvigorate their efficacy, to some extent, and have somewhat regenerated activity.

Generally, the efficacy of each of the above-mentioned processes, with respect to an increase in the reactivity of calcium hydroxide, has been found to be too low to be commercially satisfactory.

Thus, there has been a continuing commercial need, to provide calcium hydroxide compounds having an increased reactivity to the noxious acidic substances contained in the exhaust gases. Further, it is also extremely desirable to remove additional substances from the exhaust gas that might not be satisfactorily removed by existing calcium hydroxide compounds, particularly nitrogen oxides, volatile heavy metals such as mercury, cadmium, arsenic and the like, and preferably removal of organic substances such as chlorinated dioxines/furanes, chlorinated hydrocarbons, polychlorinated biphenyls (PCB's) and polycondensed aromatic hydrocarbons (PAH), in a single step together with the other noxious acidic substances and without the requirement of separate process steps.

Still further, it is commercially desirable for the carbon monoxide content and/or the total carbon content of the treated exhaust gas to be reduced, as the noxious acidic substances are being removed.

These and other needs and desires are addressed by the invention described as follows.

DETAILED DESCRIPTION OF THE INVENTION

The instant invention involves the addition of activity enhancing substances which enhance the reactivity of calcium hydroxide, and/or enhance the binding of noxious substances and/or act as activity enhancing catalysts, prior to the slaking process, during the slaking process, together with the slaking water and/or subsequent to the slaking of the burnt lime in the production of calcium hydroxide. Typically, the activity enhancing substances are added to the water required in slaking the burnt lime.

By the addition of such activity enhancing substances, in accord with the process of the invention at a time during the preparation of the calcium hydroxide, it is possible to control the activity of the calcium hydroxide when used in dry processing exhaust gases. Moreover, such enhanced calcium hydroxide can be particularly suitable for combining other substances that may be added to the process such that the $Ca(OH)_2$ can be used as a carrier for additional substances capable of binding noxious substances.

Generally the activity enhancing substances that may be added, are those compounds which act on the noxious substances comprised in the exhaust gas to promote binding to the calcium hydroxide and/or those which change the structure, the configuration and/or the surface of calcium hydroxide, to provide increased binding sites.

In one embodiment of the process according to the present invention those activity enhancing substances are added that tend to promote the binding of noxious acidic substances such as HCl, HF, $SO_2$, $SO_3$, $NO_2$, HCN, phenols, carboxylic acids and the like. Such binding enhancing substances are generally substances which are strongly basic and, therefore, preferably react with the noxious acidic substances. Consequently, a preferred embodiment of the process according to the present invention comprises adding alkali hydrogen carbonates, alkali hydroxides, and/or alkali carbonates as reactivity-enhancing substances. Particularly suited are sodium hydroxide, sodium hydrogen carbonate and/or sodium carbonate.

Typically, the activity enhancing substances are added to the slaking water and penetrate during the slaking process into the forming calcium hydroxide particle. Further reactions with calcium hydroxide may also occur in this process. For example, sodium hydrogen carbonate and sodium carbonate, are likely to react proportionally with calcium hydroxide to form calcium carbonate, with sodium hydroxide being released. The use of such highly basic reactivity enhancing substances thus results in a complex mixture of various kinds of basic substances.

Hydrate-forming compounds can also be added as reactivity-enhancing substances that promote binding. Hydrates are understood to be inorganic salts in which water is bonded to form an addition complex. Preferably, hydrate-forming compounds are used which, at elevated temperatures, release part of or all of the hydration water.

In a particular embodiment of the process of the present invention, a hydrate-containing calcium hydroxide is subjected, prior to being used for exhaust gas purification, to a thermal treatment to cause it to wholly or partially release its hydration water. By this it is possible to change the characteristics of $Ca(OH)_2$, for example the surface thereof, as desired. Dehydration can also be effected in the exhaust gas stream.

The presence of hydrate-containing compounds in the calcium hydroxide molecule appears to result in a significant increase in the reactivity of calcium hydroxide.

Preferably, calcium chloride and magnesium chloride are added as hydrate-forming compounds. Calcium chloride is known to bind water in different amounts to form corresponding hydration products. A known hydrate is the hexahydrate of calcium chloride. The hydrate can be dehydrated step-wise to an anhydrous chloride by heating it to temperatures above 260° C. Anhydrous calcium chloride, in turn, tends to take up water, so that hardly any water gets into the interior of the calcium hydroxide during conversion in the exhaust gas purification process. This results in a considerable increase in the reactivity, for example, with $SO_2$. When hydrate-forming substances are added to the slaking water, it is appropriate for the water required for hydration to be added to the slaking water.

In a further embodiment of the process of the present invention, compounds are added which form hydroxides during the slaking process which, in turn, are hydratable at temperatures in the range of from about 50° to about 450° C.

Almost all metal salts which are added to the slaking water form hydroxides in the course of the slaking process, however, not all hydroxides can be dehydrated at temperatures in the range of from about 50° to about 450° C. Dehydratable hydroxides are, for example, typically the heavy metal hydroxides.

In performing the process of the present invention, it is possible to directly employ the hydroxide-containing calcium hydroxide. It is also appropriate, however, for the hydroxide-containing calcium hydroxide to be subjected, prior to being used for exhaust gas purification, to a thermal treatment to be partially or wholly dehydrated. Typically, partial or total hydration significantly increases the active surface of the calcium hydroxide grain and, as a result, the reactivity thereof is enhanced.

Preferably, hydroxides are used which dehydrate at temperatures up to about 450° C. At 450° C. the calcium hydroxide typically begins to dehydrate.

In a particularly preferred embodiment of the present invention, water-soluble iron (II) salts and/or iron (III) salts, preferably in the form of chlorides, are used as hydroxide-forming compounds. Iron (II) salts and iron (III) salts form iron hydroxides in the alkaline region, which can be step-wise dehydrated. Typically step-wise dehydration can be performed in the exhaust gas stream during the exhaust gas purification.

It is also appropriate to carry out the dehydration, wholly or partially, prior to the exhaust gas purification step. In this way water-containing and water-releasing calcium hydroxides, which are nevertheless present in the form of a dry powder, can be produced in a well-controlled manner.

The iron-containing calcium hydroxides are particularly suited for removing nitrogen oxides in addition to the noxious acidic substances.

The hydroxide-containing and hydrate-containing calcium hydroxide powders of the invention are typically non-adhesive, readily transportable and can be easily introduced into the gas stream.

A severe problem in dry, including semi-dry, exhaust gas purification resides in the fact that, apart from the noxious acidic substances, heavy metals, in particular mercury, are present in the exhaust gas stream.

Various methods have been employed for removing mercury and other heavy metals. In dry exhaust gas purification it has not generally been possible to remove an amount of mercury sufficient to conveniently reach governmental imposed pollutant limits. In conventional methods of reducing the mercury content of exhaust gases the temperature of the exhaust gas is typically lowered by the addition of water to allow the mercury to bond with the calcium hydroxide.

Such process is disadvantageous as significant amounts of mercury still remain in the exhaust gas and, in case of an uncontrolled addition of water, a problem can be created in the subsequent filtering and/or precipitating devices.

According to the present invention, heavy metal binding substances, particular mercury-binding substances such as sulfides and mercaptans, including hydrogen sulfide, sodium hydrogen sulfide and or trimercapto-s-triazine (TMT) and the like are used. TMT is preferably employed as a sodium salt.

The sulfides are added prior to the slaking process to the burnt lime or preferably during the slaking to the water required for slaking. The mercaptan is added prior to the slaking process to the burnt lime, during the slaking process to the water required for slaking or after the slaking process to the calcium hydroxide.

An inexpensive and effective sulfide is $Na_2S \times 9H_2O$, because it has sufficient solubility and can bind mercury at temperatures of about 190° C., as shown in Table 2. Even more effective is TMT, a nontoxic and thermally stable substance. The separation of Mercury from exhaust gases is very effective, as shown in Table 2 wherein 90% of the mercury in the exhaust gas can be separated when there is a stoichiometric ratio of 10:1 TMT to mercury.

The combination of calcium hydroxide and mercury-binding substances, with characteristically smelly hydrogen sulfide and sodium hydrogen sulfide, can be employed in the form of odorless calcium sulfides, and the neutralization of the noxious acidic substances can be carried out together with the binding of mercury. In this way, additional exhaust gas purification stages are avoided.

Generally, the stoichiometric ratio of sulfide and/or mercaptan used relative to the amount of heavy metal in the exhaust gas ranges from about 0.25:1 to about 100:1, preferably from about 1:1 to about 50:1, more preferably from about 2:1 to about 40:1 and most preferably from about 5:1 to about 40:1.

According to a preferred embodiment of the invention, at least one sulfide, selected from the group consisting of hydrogen sulfide, sodium hydrogen sulfide and sodium sulfide, or said mercaptan, is applied to a surface active substance selected from the group consisting of activated coal, activated aluminum oxide, silica gel, kieselguhr, zeolite and open-hearth lignite coke. These modified surface-active substances are added prior to the slaking process to the burnt lime or during the slaking to the water required for slaking or after the slaking process to the calcium hydroxide.

As can be seen from example 9, a sulfide containing activated coal with an amount of 15% sulfur was used to produce calcium hydroxides with 0.2%, 0.5% and 1.0% by weight of the sulfide activated coal. Table 4, shows that it is most favorable to apply a sulfide on an activated coal with high surface area. The separation degree of mercury from exhaust gases is more than 90%.

As a result of the presence of iron compounds in the calcium hydroxide, the nitrogen oxides are typically oxidized to higher nitrogen oxides which can then be bonded with calcium hydroxide. Consequently, by means of the process according to the present invention, numerous noxious substances can be removed from the exhaust gas stream that would have previously been unaffected.

In another embodiment of the process of the present invention, various combinations of substances are added to the slaking water to remove various noxious substances. According to the present invention, a particularly advantageous combination comprises sodium hydrogen carbonate, iron (III) chloride and trimercapto-s-triazine (TMT). With such combination not only noxious acidic substances can be separated out but also nitrogen oxides and highly volatile heavy metals, in particular mercury.

Thus, in a preferred embodiment of the present invention acid-binding, hydrogen-binding and heavy metal-binding substances are added to the slaking water to prepare a modified calcium hydroxide.

Calcium hydroxides can be prepared which contain oxidizing, reducing, neutralizing and/or heavy-metal containing substances. For example, one can add tin and zinc chlorides to the slaking water which are then bonded in the calcium hydroxide. The metal salts can, for example, be reduced to tin and zinc, respectively, by means of hydrogen. The zinc and tin metal, which is finely distributed over the calcium hydroxide, then preferably serves to take up mercury from the exhaust gas stream.

It is advantageous to have heavy metals as oxidizing or reducing substances. Heavy metals can be used in several oxidation states and include molybdenum, tungsten, manganese, titanium, copper, chromium and vanadium.

Typically heavy metals are added to the slaking water in the form of water-soluble salts and, after having been bound to the calcium hydroxide, can be subjected to additional reduction or oxidation treatment.

Apart from the conventional "deacidification" of the exhaust gas, the heavy metal-containing hydroxides can be also used for further purifying the exhaust gas. For example, carbon monoxide can be oxidized to carbon dioxide and the hydrocarbons contained in the exhaust gas can be oxidized so that the overall carbon content is reduced.

Finely distributed activated carbon, open-hearth lignite coke, activated aluminum oxide, kieselguhr, zeolites and/or silica gel can be used as surface-active substances to modify calcium hydroxide. These surfactants act to remove residues of organic compounds from the exhaust gas stream as well as chlorinated hydrocarbons, such as dioxines, hexachlorobenzene, pentachlorophenol and the like, and polycondensated aromatic hydrocarbons, such as benzo(a)pyrene, dibenz(a,h)anthracene and the like. Generally, these substances are present in gases or exhaust gas streams only in small trace concentrations. They are difficult to be separated out by means of conventional separating devices such as washers, electrostatic separators or fabric filters. When surfactants are used with the calcium hydroxide, these trace concentrations and residues of organic compounds can be bonded to the surfactants and thus removed from the exhaust gas stream.

These modified calcium hydroxides are prepared in that silica gel or activated aluminum oxide is a. added prior to the slaking process to the burnt lime or b. during the slaking process or to the water required for slaking or at least a substance selected from the group consisting of activated coal, kieselguhr, zeolites and open-hearth lignite coke, is c. added prior to the slaking process to the burnt lime d. during the slaking process or to the water required for slaking or e. after the slaking process to the calcium hydroxide.

Generally, the amount of activated coal used relative to the amount of calcium hydroxide ranges from about 0.1 to about 10 weight percent of the calcium hydroxide, preferably from about 0.2 to about 5 weight percent, more preferably from about 0.5 to about 1 weight percent and most preferably from about 0.75 to about 1 weight percent.

Typically, the amount of open-hearth lignite coke, activated aluminum oxide, kieselguhr, zeolites and/or silica gel used relative to the amount of calcium hydroxide ranges from about 0.5 to about 25 weight percent of the calcium hydroxide, preferably from about 1 to about 15 weight percent, more preferably from about 2.5 to about 10 weight percent and most preferably from about 3 to about 10 weight percent.

A further problem arising in the separation of pollutants are the heavy metals in particular, mercury, arsenic, antimony and thallium which typically are highly volatile at temperatures of from about 20° to about 200°. At present heavy metals are removed from the exhaust gas stream by cooling the stream sufficiently for the water to condensate. This cooling step not only requires additional equipment but also is energy intensive.

By the use of the above-mentioned surfactants, the highly volatile heavy metals can also be bonded to the calcium hydroxide surfactant mixture and can be removed at temperatures of from about 100° to about 200° C. Very strong mercury-binding substances are activated coal and open-hearth lignite coke.

A mixture of 99% $Ca(OH)_2$ and 1% activated coal (surface area 1100 $m^2/g$) is very effective in separating mercury from exhaust gases even at a temperature of 190° C. Nearly 90% of the mercury can be fixed to the coal. See table 6.

Beside activated coal there are some more surfactants which are more or less suited to absorb volatile heavy metals. They are open-hearth lignite coke (HOK), aluminum oxide, silica gel, kieselguhr and zeolites.

Mixtures of Ca(OH)2 and HOK are produced by the three methods: burnt lime method, slaking water method or mixing method. Table 7 shows that mercury separation, from 85.4% to 96.7%, is possible.

Mixtures of Ca(OH)2 and aluminum oxide are also effective in absorbing mercury from exhaust gases. The best separation degree of 52.3% is obtained by using a mixture of 90% $Ca(OH)_2$ and 10% $Al_2O_3$. Mixtures of $Ca(OH)_2$ and silica gel or kieselguhr are not so good as those with activated coal or HOK.

The advantage of $Al_2O_3$, silica gel and kieselguhr is that they are nonburnable substances. This is very important when there is the danger of ignition of coal or HOK.

The mixtures of $Ca(OH)_2$ and surface active substances, produced by the methods with the compositions of the present invention are highly effective in absorbing organic harmful substances from exhaust gases.

These substances are especially chlorinated hydrocarbons like tetra-, penta- and hexachlorobenzenes and polychlorinated biphenyls, chlorophenols like pentachlorophenols, polychlorinated dioxines and furanes (called dioxines) and polycondensed aromatic hydrocarbons.

The tables 8, 9 and 10 demonstrate the effect of the modified $Ca(OH)_2$ in the case of separating out harmful substances from the exhaust gas of incineration plants. They fix Hg, As, Ed, tetrachlorobenzene, pentachlorobenzene, hexachlorobenzene, PCB, dioxines and PAH and separate them from the exhaust gas.

The process for purifying exhaust gases from harmful inorganic or organic substances is carried out by introducing the modified calcium hydroxide into the exhaust gas at a temperature of 20° to 1200° C., mixing it with the gas and removing the solid materials containing the harmful substances by dust separators, especially fabric filters.

According to another embodiment of the present invention, activated coal, open-hearth lignite coke, activated aluminum oxide and/or silica gel are added as surfactants, in finely distributed form, to the slaking water for burnt lime. These surfactants are particularly suited for performing the process of the present invention, with activated coal being particularly suited for bonding organic substances and mercury, and silica gel and aluminum oxide being particularly suited for bonding polar compositions, such as oxidized organic compounds, and noxious inorganic substances, such as hydrogen chloride and sulfur dioxide.

According to another embodiment of the present invention a modified calcium hydroxide is prepared in that at least a catalytic active substance selected from the group consisting of vanadium, tungsten, chromium, molybdenum, manganese, iron, nickel, cobalt, and titanium is applied to a surface active substance selected from the group consisting of silica ge, activated aluminum oxide, activated coal, kieselguhr, zeolites or open-hearth lignite coke and said catalytic active substance containing surface active substance is a. added prior to the slaking process to the burnt lime and the mixture is slaked by adding water to the mixture, or b. added during the slaking process or to the water required for slaking burnt lime and performing the slaking process, or c. mixed with calcium hydroxide.

This modified calcium hydroxide is introduced into the exhaust gas at a temperature of 20° to 1200° C., mixed with the gas to separate volatile heavy metals, especially mercury, organic harmful substances like dioxines, PCB's chlorinated benzenes, chlorinated hydrocarbons and PAH's, and the solid materials containing the harmful substances are removed by dust separators, especially fabric filters.

According to another embodiment of the present invention a modified calcium hydroxide is prepared in that at least a catalytic active substance selected from the group consisting of vanadium, tungsten, chromium, molybdenum, manganese, iron, nickel, cobalt, and titanium is applied to a surface active substance selected from the group consisting of silica gel, activated aluminum oxide, activated coal, kieselguhr, zeolites or open-hearth lignite coke and said catalytic active substance containing surface active substance is a. added prior to the slaking process to the burnt lime and the mixture is slaked by adding water to the mixture, or b. added during the slaking process or to the water required for slaking burnt lime and performing the slaking process, or c. mixed with calcium hydroxide.

This modified calcium hydroxide is introduced into the exhaust gas at a temperature of 20° to 1200° C., mixed with the gas to separate volatile heavy metals, especially mercury, organic harmful substances like dioxines, PCB's, chlorinated benzenes, chlorinated hydrocarbons and PAH's, and the solid materials containing the harmful substances are removed by dust separators, especially fabric filters. The heavy metals are used as chlorides, sulfated or preferably nitrates.

According to a further embodiment of the present invention a modified calcium hydroxide for use in purification of exhaust gases is produced in that at least a soluble heavy metal selected from the group consisting of vanadium, tungsten, chromium, manganese, iron, nickel, cobalt and titanium is solved in the slaking water for slaking burnt lime and performing the slaking process. These heavy metals containing calcium hydroxides are useful for purifying exhaust gases from organic harmful substances, especially chlorinated hydrocarbons like polychlorinated dioxines and furanes, polychlorinated biphenyls, hexachlorobenzenes and pentachlorophenols, and polyaromatic hydrocarbons.

They are introduced into the exhaust gas at a temperature of 20° to 1200° C., mixed with the gas, and the solid materials containing the harmful substances are removed by dust separators, especially fabric filters.

The heavy metals are effective as catalysts for oxidation of NO to NO2, CO to CO2 and destroying the organic substances by decomposition and oxidation.

The process of the present invention can be performed such that additives which act as catalysts, or bind noxious substances, are applied to the surfactants before the surfactants are introduced in the slaking process for burnt lime. This can be done by adding compositions which act as catalysts or bind noxious substances to the slaking water and thereafter adding the surfactants to the slaking water. By allowing the water to rest for a prolonged period of time, where appropriate for hours, the surfactants absorb the substances contained in the slaking water. After the slaking operation, calcium hydroxide and surfactants are intimately mixed and appear to be present in a highly distributed manner.

Generally it is preferred that mercury-binding compounds, such as sodium sulfide, mercaptans or trimercapto-s-triazine and/or vanadium tungsten, molybdenum, manganese, iron, nickel, cobalt, chromium and/or titanium compounds be applied to the surfactants prior to the slaking operation. For the exhaust gas purification, the catalytic or mercury-binding substances provide a large surface area and are particularly effective.

In order to produce reactive calcium hydroxides for the purification of gases and exhaust gases, the surfactants, such as activated coal, open-hearth lignite coal, aluminum oxide, silica gel and the like, can also be mixed into the burnt lime before slaking.

The mixing can either be performed in mixing apparatus or in mills.

The invention furthermore relates to a process for purifying gases and exhaust gases from noxious acidic substances, such as hydrogen chloride, hydrogen fluoride, sulfur dioxide, hydrogen cyanide and the like, and from nitrogen oxides, hydrocarbons, chlorinated hydrocarbons and volatile heavy metals, like mercury, arsenic, antimony, cadmium and thallium. In such process, finely powdered calcium hydroxide containing surface-active substances, like activated coal, open-hearth lignite coke, silica gel and/or activated aluminum oxide, are added to the gas or exhaust gas stream, and the hydroxide, including said noxious substances, is separated out by means of dust collectors.

The purification of gases can be conducted at temperatures which vary over a wide range of from about 20° to about 1200° C. At temperatures above about 400° C. it is particularly preferred to use activated aluminum oxide or silica gel as the surfactant. At lower temperatures all of the above-mentioned surfactants are suitable.

It is also within the invention to pass the gas or exhaust gas to be purified through a stationary or moving layer of $Ca(OH)_2$, which has been treated in the afore-described manner. Granular $Ca(OH)_2$ can be employed for the stationary layer. However, it is also feasible to apply $Ca(OH)_2$ on a further granular material and, subsequently, employ it in the purification operation.

The amount of the substances to be employed is dependent on the amount of the noxious substance to be removed and the solubility of the individual substance in water. The upper limit of the individual substance to be added depends on the solubility of the latter in water.

By use of the calcium hydroxide produced according to the process of the present invention it is possible to significantly enhance the reactivity of $Ca(OH)_2$, i.e., reduce the consumption of $Ca(OH)_2$ required for removing noxious acidic substances. At the same time, volatile heavy metals, for example, mercury, cadmium and the like, can be removed from the exhaust gas stream.

The incorporation of additives to the slaking water causes physical properties, such as the surface characteristics, flow properties, spreading properties in the exhaust gas stream etc., to be changed and influenced in a controlled manner.

When use is made of salts which include chloride as anion, the slaking process is considerably accelerated. As a result, it is not always possible to guarantee that the burnt lime thoroughly mixes with the water and the substances dissolved therein. The use of modified calcium hydroxides for the purification of gas and exhaust gases may then result in considerable variations in the output of removed material.

The addition of salts which include sulfate and hydroxide as anion results in the slaking process being retarded. A retardation of the slaking process involves the disadvantage that the efficiency of the slaking apparatus used is decreased, i.e., the amount of calcium hydroxide produced over a specific period of time is reduced. In addition, when the slaking process is considerably retarded, the slaking temperature remains low with the result that a product is obtained which is not active enough to purify gases and exhaust gases.

Consequently, according to a further practice of the subject matter of the present invention, it is proposed to use salts or substances which decelerate the slaking speed, when salts or substances are used which accelerate the slaking speed.

It has been found that the retardant action of sulfates can be compensated for, by example, through adding chlorides. The mixing ratio of the retardant salts to the accelerating salts can be varied over a wide range such that the duration of the slaking process can be set as desired.

In a further embodiment of the process of the present invention, when metal salts that accelerate the slaking process are used, such as those containing chloride, nitrite and/or nitrate anions, metal salts containing sulfate, hydrogen carbonate, phosphate and/or hydroxide anions should be added to retard the slaking process.

For example, calcium chloride very strongly accelerates the slaking process. The rapid slaking reaction can be retarded by use of iron sulfate and the duration of the slaking process can be set as desired. The salts which accelerate the slaking process and those which retard the same must be so selected that, when dissolving in the slaking water, they do not cause precipitation reactions.

It has been found advantageous for the alkali, magnesium, calcium aluminum and iron chlorides to be employed with iron and/or aluminum sulfates as salts which retard the slaking process.

Generally, it has been found advantageous in the process according to the present invention if the salts accelerating the slaking process and the salts retarding the slaking process are employed at a weight ratio of about 1:5 to about 5:1.

The modified $Ca(OH)_2$ compounds produced according to the process of the present invention are not only suited to find noxious substances but also to act as catalysts in oxidation and reduction processes.

The following examples are set forth to illustrate the manufacturing and use of the compounds of the present invention and are not to be construed as limitations thereto.

EXAMPLE 1

Prior Art Calcium Hydroxide 25 g of CaO were slaked with 13.5 g of water. A fine white powder comprising calcium hydroxide was obtained.

In a glass reactor, 11.5 Liters of an exhaust gas comprising 80% by vol nitrogen, 20% by vol oxygen, 262 mg/L moisture and 22.1 mg/L HCl were passed through 253 mg of the previously prepared powdered calcium hydroxide at a temperature of about 170° C. The powder was thereafter analyzed and it was determined that 21.1% of the HCl was absorbed by $Ca(OH)_2$.

EXAMPLE 2

Activity Enhanced Calcium Hydroxide 28 g of CaO were slaked with 16.56 g of water to which 1.3 g of $CaCl_2$ had been added. A fine powder comprising, activity enhanced, calcium hydroxide was obtained.

In a glass reactor, 12.75 Liters of an exhaust gas comprising 80% by vol nitrogen, 20% by vol oxygen, 235 mg/L moisture and 19.8 mg/L HCl was passed through 274 mg of the previously prepared, enhanced, powdered calcium hydroxide (corresponding to 253 mg of pure $Ca(OH)_2$) at a temperature of about 167° C. The powder was thereafter analyzed and it was determined that 23.7% of the HCl was absorbed by $Ca(OH)_2$. As compared to example 1, this constitutes an increase of 12.3% over the percentage removed in Example 1.

EXAMPLE 3

Activity Enhanced Calcium Hydroxide 28 g of CaO were slaked with 15.2 g of water to which 2.3 g of $FeCl_3 \times 6H_2O$ had been added. A fine powder of faintly pink color was obtained.

In a glass reactor, 12 Liters of an exhaust gas comprising 80% by volume of nitrogen, 20% by volume of oxygen, 250 mg/L moisture and 21 mg/L HCl was passed through 277 mg of the previously prepared, enhanced, powdered calcium hydroxide (corresponding to 253 mg of pure $Ca(OH)_2$) at a temperature of about 166° C. The powder was thereafter analyzed and it was determined that 28.1% of the HCl was absorbed by $Ca(OH)_2$. As compared to example 1, this constitutes an increase of 33% over the percentage removed in Example 1.

EXAMPLE 4

Activity Enhanced Calcium Hydroxide 28 g of burnt lime was slaked with 15.2 g of water in which 1.4 g of activated coal, having an active surface of 700 $m_2/g$, had been suspended. A grey powder having excellent flow properties was obtained.

A solid layer of 252 mg of the powder was formed and a gas comprising 80% by volume of nitrogen, 20% by volume oxygen, 0.26 g/L moisture, 22.5 mg/L HCl and 1.29 µg/l $HgCl_2$ was directed over the above-mentioned substance at a temperature of about 149° C. Altogether, 11.2 Liters of the gas was directed over the modified $Ca(OH)_2$. The gas was thereafter analyzed and of the 14.4 µg of $HgCl_2$, originally contained in the gas, 76.5% was absorbed by the activated grey powder.

EXAMPLE 5

Controlling Reaction Time Using Iron Metal Salts.

15.2g of water was added to three samples, each containing 28 g of burnt lime which had been allowed to rest for about one month. After about 40 seconds the reaction mixture reached a temperature of 90° C.

1.4 g of iron (III) sulfate$\times 7H_2O$ was added to the slaking water of the first sample and a temperature of 90° C. was reached after about 120 seconds had lapsed.

2.3 g of iron (III) chloride$\times 6H_2O$ was added to the slaking water of the second sample and resulted in an almost spontaneous reaction. A temperature of 90° C. was reached after only about five seconds.

0.4 g of iron (III) chloride$\times 6H_2O$ and 0.2 g iron (III) sulfate$\times 7H_2O$ were added to the slaking water of the third sample and a temperature of 90° C. was reached after about 50 seconds.

This example illustrates that various metal salts can be used in retarding and accelerating reaction in the slaking water.

EXAMPLE 6

Controlling Reaction Times Using Metal Salts 28 g of freshly produced burnt lime were slaked with 18 g of water. A temperature of 90° C. was reached after 13 seconds.

When 0.4 g of aluminum sulfate$\times 18H_2O$ are added to the slaking water, about 18 seconds were required to reach a temperature of 90° C.

The slaking period can be reduced by more than 50% if an amount of 0.2 g of iron (III) chloride$\times 6H_2O$ is added to the above amount of aluminum sulfate. The time required to reach a temperature of 90° C. is then only about 11 seconds.

EXAMPLE 7

Modification of Calcium Hydroxides with Sulfides $H_2S$, $Na_2S$, NaHS and Mercaptanes Modified calcium hydroxides were manufactured using the following three general procedures:

Burnt lime method—burnt lime and the dry sulfide or mercaptanes are mixed thoroughly. The slaking process is then performed by the addition of 17 g of water to 28 g of burnt lime (CaO). Excess water is vaporized by the heat of the slaking process and a dry material is obtained. The amount of the sulfides in the material is determined based on the calcium hydroxide recovered.

Slaking method—sulfides or mercaptanes are added to 17 g of slaking water and mixed thoroughly. The thus treated water is added to 28 g of CaO. Alternatively, the mercaptanes or sulfides are added to the CaO simultaneously with the slaking water.

Mixing method—dry calcium hydroxide is mixed thoroughly with the sulfides or mercaptanes and the slaking water is added to the mixture.

EXAMPLE 8

Separation of Mercury From Exhaust Gas Using Calcium Hydroxides Modified With $Na_2S$ and Trimercaoto-s-triazine A layer of material comprising 1 gram of $Na_2S$ and trimercapto-s-triazine was formed in accord with Table 1 and a simulated exhaust gas, comprising 80% by vol nitrogen, 20% by vol oxygen, 0.26 g/L moisture, 22.5 mg/L HCl and 8.2 µg/l $HgCl_2$ was directed through the above-mentioned substances at a temperature of about 190° C. Altogether, 40 Liters of the gas was directed through the various substance containing modified $Ca(OH)_2$. Table 2 details the results obtained.

EXAMPLE 9

Calcium Hydroxides, Modified With Sulfides or Mercaptanes on Surface Active Substances A sulfide containing activated coal, with properties as described in Table 3, was prepared by soaking coal with a solution of sodium sulfide and drying the mixture. The amount of sulfur contained in the resulting mixture was 15% by weight.

Modified calcium hydroxides were prepared by using the sulfide activated coal in accord with the various methods of Example 7. Calcium hydroxides were produced with 0.2%, 0.5% and 1% by weight of the sulfide activated coal.

EXAMPLE 10

Separation of Mercury From Exhaust Gas Using Sulfides on Surface Activated Coal A layer of material comprising 1 gram of the various sulfide activated coal, calcium hydroxide substances formed in Example 9 was formed and a simulated exhaust gas, comprising 80% by vol nitrogen, 20% by vol oxygen, 0.26 g/L moisture, 22.5 mg/L HCl and 8.2 µg/l $HgCl_2$ was directed through the above-mentioned substances at a temperature of about 190° C. Altogether, 40 Liters of the gas was directed through the various substances containing modified $Ca(OH)_2$. Table 4 details the resulting mercury separation obtained.

From these results, it is obvious that the separation of mercury is enhanced when the sulfided activated coals are used, compared to the use of surface active substances alone.

EXAMPLE 11

Calcium Hydroxides, Modified With Surface Active Substances

Modified calcium hydroxides were prepared in accord with the methods described in Example 7, however, instead of using sulfides and mercaptanes, surface active substances were used. Table 5 illustrates the various surface active agents used and their properties.

EXAMPLE 12

Separation of Mercury From Exhaust Gas

The modified calcium hydroxides prepared in Example 11 were used to treat a synthetically prepared exhaust gas in accord with the process of Example 8. The results are summarized in Table 6 for use of activated coal and Table 7, for the surface active substances including open-hearth lignite coke, aluminum oxides AX and GX, silica gels E and M, and kieselguhr MN. As can be seen from the results, open-hearth lignite coke has excellent properties as far as the separation of mercury from exhaust gases is concerned. Activated coal, based on stone coal, is also very suitable. Aluminum oxide appears effective but such materials having higher surface areas appear to be more effective.

Silica gel appears to have poor properties for the binding of mercury in exhaust gases.

The mercury binding property of kieselguhr appears to lay between aluminum oxide and silica gel.

EXAMPLE 13

Modified Calcium Hydroxide Use in Garbage Incineration Plant

A garbage incineration plant, with a capacity of handling about 8 tons/hour of garbage and producing about 48,000 $m^3$ of exhaust gases/hour, was used to test the efficacy of various of the modified calcium hydroxides of the invention. Hot gases passing the boiler are treated at 200° C. in the exhaust gas cleaning system. The system consists of a calcium hydroxide dosing plant, 2 reactors, a bag house, a transport system for used calcium hydroxide and an exhauster.

The modified calcium hydroxide was manufactured by mixing $Ca(OH)_2$ with the illustrated additives and thereafter the exhaust gas was mixed therewith and the primary reaction between the acidic substances and calcium hydroxide appears to occur in the reactors. The additives appeared to react with the harmful substances further along in the process, primarily in the fabric filter of the bag house.

The bag house comprised 8 chambers with a total of 592 filter hoses manufactured of teflon. The filter area was approximately 1400 $m^2$.

The modified calcium hydroxides were tested for the separation of volatile heavy metals such as mercury, cadmium and arsenic, hydrocarbons such as chlorinated benzenes, polychlorinated biphenyls, chlorinated dioxines and furanes, as well as polyaromatic hydrocarbons. The crude gas and the cleaned gas were tested.

Table 8 illustrated the results of calcium hydroxide modified with activated coal, based on stone coal. Table 9 illustrates the results of calcium hydroxide modified with the surface active open-hearth lignite coke and aluminum oxide.

Calcium hydroxide which is modified by open-hearth lignite coke or activated coal based on stone coal appears well suited to clean the exhaust gas of a garbage incineration plant.

EXAMPLE 14

Modified Calcium Hydroxide Use in an Incineration Plant for Treating Garbage and Industrial Wastes A combined garbage/industrial waste incineration plant having a capacity of 3 tons/hour and producing about 32,000 $m^3$ of exhaust gases per hour, was used to test the efficacy of various modified calcium hydroxides of the invention. Hot gases passing through the boiler are cooled by the addition of water to 150° C., they are filtered free of dust and fed into the exhaust cleaning system. The cleaning system comprised a calcium hydroxide dosing plant, a reactor, a bag house and an exhauster.

Calcium hydroxide to which had been added open-hearth lignite coke was used, mixed in dry form.

The modified calcium hydroxides were tested for the separation of volatile heavy metals such as mercury, selenium and arsenic, and hydrocarbons such as pentachlorinated phenols, chlorinated benzenes, chlorinated dioxines and furanes.

The results are summarized in Table 10. The modified calcium hydroxide appears well suited to separate the above mentioned harmful substances from the exhaust gas of combined garbage/industrial waste incineration plants.

TABLE 1

Manufacturing of $Ca(OH)_2$ modified with sulfide and mercaptan.

| Sulfide/ Mercaptan | Amount of sulfide/ mercaptan compound added | | | sulfide/ mercaptan contained in product % |
|---|---|---|---|---|
| | $CaO^x$ g 1) | slaking water g 2) | $Ca(OH)_2$ g 3) | |
| Sodium sulfide ($Na_2S \cdot 9H_2O$) | 0.011 | 0.011 | — | 0.03 |
| | 0.055 | 0.055 | — | 0.15 |
| | 0.11 | 0.11 | — | 0.3 |
| Trimercapto- s-triazine ($Na_3S_3N_3C_3$) | 0.007 | 0.007 | 0.007 | 0.019 |
| | 0.035 | 0.035 | 0.035 | 0.095 |
| | 0.070 | 0.070 | 0.070 | 0.19 |

1) = Addition of sulfide/mercaptan to 28 g CaO
2) = Addition of sulfide/mercaptan to 17 g $H_2O$
3) = Addition of sulfide/mercaptan to 37 g $Ca(OH)_2$

TABLE 2

Separation of mercury from a synthetic exhaust gas by use of Ca(OH)₂ modified with sulfide and mercaptan

| Sulfide/ Mercaptan | Burnt lime method stoichiom.*) | % | Slaking water method stoichiom.*) | % | Mixing method stoichiom.*) | % |
|---|---|---|---|---|---|---|
| Trimercapto-s-triazine | 1 | 58 | 1 | 62 | 1 | 52 |
| Trimercapto-s-triazine | 5 | 65 | 5 | 71 | 5 | 60 |
| Trimercapto-s-triazine | 10 | 80 | 10 | 90 | 10 | 75 |
| Na₂S × 9 H₂O | 1 | 48 | 1 | 51 | — | — |
|  | 5 | 57 | 5 | 62 | — | — |
|  | 10 | 72 | 10 | 76 | — | — |

*) = stoichiom. means the stoichiometric ratio of sulfide or mercaptan to mercury

TABLE 3

Properties of sulfide activated coal

| Property | Dimension | Value |
|---|---|---|
| Bulk density | [kg/m³] | ca. 600 |
| Moisture | (weight-%) | <5 |
| Ash content 1) | (weight-%) | <5 |
| Sulfur content | (weight-%) | 15 |
| Surface area 1) | [m²/g] | 1000 |

1) Determined on base material, not at final impregnated product

TABLE 4

Separation of mercury from a synthetic exhaust gas by use of a mixture of Ca(OH)₂ modified with sulfide on activated coal

| % Sulfide Activated Coal as given in Table 3 in a mixture with Ca(OH)₂ | Burnt lime method % separation | Slaking water method % separation | Mixing method % separation |
|---|---|---|---|
| 0.2 | 73.2 | 74.1 | 72.9 |
| 0.5 | 86.8 | 88.4 | 87.5 |
| 1.0 | 92.1 | 93.0 | 93.8 |

TABLE 5

Properties of surface active substances as used

| Properties | Dimension | open-hearth lignite coke (HOK) | activated coal (AK) | aluminum oxide Al₂O₃-AX | aluminum oxide 6X | silica gel E | silica gel M | kieselguhr M N-4 |
|---|---|---|---|---|---|---|---|---|
| Moisture | % | 0.5 | <5 | 0 | 0 | 0 | 0 | 3 |
| Ash content | % | 9.0 | <5 | — | — | — | — | — |
| Surface area | m²/g | 290 | 1100 | 170 | 120 | 800 | 500 | 28 |
| Pore volume | % | 50 | — | — | — | 0.45*) | 0.7*) | — |
| Bulk density | t/m³ | 0.5 | 0.43 | 0.6 | 0.6 | 0.7 | 0.4 | 0.16 |
| Sulfur content | % | 0.45 | — | — | — | — | — | — |
| Grain size <40 μm | % | 99 | 99 | 100 | 100 | <99 | –99 | <99.7 |

*) = Dimension cm³/g

TABLE 6

Separation of mercury from a synthetic exhaust gas by use of Ca(OH)₂ and activated coal

| % Act. coal | Burnt lime % Separation | Slaking water % Separation | Mixing % Separation |
|---|---|---|---|
| 0.2 | 68.4 | 67.2 | 70.4 |
| 0.5 | 72.4 | 71.7 | 84.2 |
| 1.0 | 82.6 | 81.2 | 89.6 |

TABLE 7

Separation of mercury from a synthetic exhaust gas by use of mixtures from CA(OH)₂ active substances.

| Surface Active Substance | % content | Burnt lime % Separation | Slaking water % Separation | Mixing % Separation |
|---|---|---|---|---|
| Open-hearth lignite coke | 2.5 | 67.7 | 69.1 | 70.2 |
|  | 5.0 | 75.0 | 75.4 | 88.1 |
|  | 10.0 | 86.9 | 85.4 | 96.7 |
| Aluminum Oxide AX | 5.0 | 47.8 | 46.7 | — |
|  | 10.0 | 52.3 | 50.9 | — |
| Aluminum OXIDE GX | 5.0 | 34.8 | 34.0 | — |
|  | 10.0 | 45.0 | 44.1 | — |
| Silica Gel E | 5.0 | 23.8 | 20.2 | — |
|  | 10.0 | 37.6 | 34.4 | — |
| Silica Gel M | 5.0 | 10.8 | 10.2 | — |
|  | 10.0 | 29.4 | 30.2 | — |
| Kieselguhr MN | 5.0 | 38.7 | 38.0 | 39.1 |
|  | 10.0 | 40.3 | 40.0 | 42.3 |

TABLE 8

Separation of pollutants from the exhaust gas of a garbage incineration plant using Ca(OH)$_2$ modified with activated coal.

| Pollutant | dimension | crude gas | pollutants Ca(OH)$_2$ alone | pollutants Ca(OH)$_2$ with 3% activated coal | pollutants Ca(OH)$_2$ with 5% activated coal |
|---|---|---|---|---|---|
| Hg | mg/m$^3$ | 0.3 | 0.22 | 0.005 | 0.003 |
| As | μg/m$^3$ | 3 | 2 | | |
| Cd | μg/m$^3$ | 125 | 50 | | |
| Tetrachloro-benzene | ng/m$^3$ | 980 | 420 | 4 | 1 |
| Pentachloro-benzene | ng/m$^3$ | 820 | 380 | 2 | 1 |
| Hexachloro-benzene | ng/m$^3$ | 80 | 50 | 1 | <1 |
| Polychlorinated biphenyls* | ng/m$^3$ | 70 | 42 | 4 | 2 |
| Polychlorinated NATO Equivalents (I-TEQ) dioxines and furanes PCDD/PCDF** | ng/m$^3$ | 8 | 1 | 0.04 | 0.02 |
| Polyaromatic hydrocarbons PAH*** | ng/m$^3$ | 1.2 | 0.9 | 0.06 | 0.07 |

*analysis comprised 9 substances.
**analysis comprised 10 groups and 15 isomers.
***analysis comprised 18 substances.

TABLE 9

Separation of pollutants from the exhaust gas of a garbage incineration plant using Ca(OH)$_2$ modified with HOK* or Al$_2$O$_3$.

| Pollutant | dimension | crude gas | pollutants Ca(OH)$_2$ alone | pollutants Ca(OH)$_2$ 3% HOK | pollutants Ca(OH)$_2$ 5% HOK | pollutants Ca(OH)$_2$ 7.5% HOK | Crude Gas** | Pollutants Ca(OH)$_2$ 5% Al$_2$O$_3$ | Pollutants Ca(OH)$_2$ 10% Al$_2$O$_3$ |
|---|---|---|---|---|---|---|---|---|---|
| Hg | mg/m$^3$ | 0.3 | 0.22 | 0.015 | 0.010 | 0.008 | 0.344 | 0.080 | 0.041 |
| As | μg/m$^3$ | 3 | 2 | 0.4 | <0.4 | | | | |
| Cd | μg/m$^3$ | 125 | 50 | <0.001 | <0.001 | | | | |
| Tetrachloro-benzene | ng/m$^3$ | 980 | 420 | 4 | 4 | 2 | | | |
| Pentachloro-benzene | ng/m$^3$ | 820 | 380 | 3 | 3 | 2 | | | |
| Hexachloro-benzene | ng/m$^3$ | 80 | 50 | 1 | 1 | <1 | | | |
| Polychlorinated biphenyls** | ng/m$^3$ | 70 | 42 | 4 | 2 | 2 | | | |
| Polychlorinated NATO Equivalents (I-TEQ) dioxines and furanes PCDD/PCDF**** | ng/m$^3$ | 8 | 1 | 0.06 | 0.04 | 0.03 | 12 | 0.04 | |
| Polyaromatic hydrocarbons PAH***** | ng/m$^3$ | 1.2 | 0.9 | 0.24 | 0.20 | 0.18 | 2.4 | 0.8 | |

*open-hearth Lignite Coke.
**crude gas used in Al$_2$O$_3$ trials only.
***analysis comprised 9 substances.
****analysis comprised 10 groups and 15 isomers.
*****analysis comprised 18 substances.

TABLE 10

Separation of pollutants from the exhaust gas of a garbage/
industrial waste incineration plant using Ca(OH)$_2$
modified with open hearth-lignite coke (HOK).

| Pollutant | dimension | crude gas | pollutants Ca(OH)$_2$ alone | pollutants Ca(OH)$_2$ + 3% HOK | pollutants Ca(OH)$_2$ + 5% HOK | pollutants Ca(OH)$_2$ + 7.0% HOK |
|---|---|---|---|---|---|---|
| Hg | mg/m$^3$ | 0.214 | 0.110 | 0.010 | 0.007 | 0.003 |
| As | µg/m$^3$ | 205 | 120 | 11 | 5 | |
| Cd | µg/m$^3$ | 120 | 20 | 6 | n.n* | |
| Tetrachloro-phenol | ng/m$^3$ | 0.3 | 0.18 | 0.05 | 0.03 | 0.01 |
| Pentachloro-benzene | ng/m$^3$ | 82 | 70 | 25 | 16 | 10 |
| Hexachloro-benzene | ng/m$^3$ | 110 | 90 | 30 | 21 | 12 |
| Polychlorinated NATO Equivalents (I-TEQ) dioxines and furanes PCDD/PCDF** | ng/m$^3$ | 5 | 2 | 0.08 | 0.05 | 0.03 |

*n.n = below detectable limits.
**analysis comprised 10 groups and 15 isomers.

What is claimed is:

1. A dry absorption process for purifying an exhaust gas containing impurities selected from the group consisting of volatile heavy metals, mercury, chlorinated hydrocarbons, polychlorinated dioxines and furanes, polychlorinated biphenyls, hexachlorobenzenes and pentachlorophenols, and polyaromatic hydrocarbons, comprising the steps of:

(a) manufacturing a modified calcium hydroxide by adding from 0.1 to 25 wt. % of at least one substance selected from the group consisting of activated coal and open-hearth lignite coke to calcium hydroxide;

(b) introducing said modified calcium hydroxide in dry powder form into the exhaust gas at a temperature of 20° to 1200° C.;

(c) mixing said modified calcium hydroxide with the exhaust gas to absorb said impurities; and (d) removing the modified calcium hydroxide containing the absorbed impurities from said exhaust gas.

2. The process according to claim 1, characterized in that the content of activated coal in the mixture with calcium hydroxide ranges from 0.2 to 5 wt. %.

3. The process according to claim 1, characterized in that the content of activated coal in the mixture with calcium hydroxide ranges from 0.5 to 1 wt. %.

4. The process according to claim 1, characterized in that the content of activated coal in the mixture with calcium hydroxide ranges from 0.75 to 1 wt. %.

5. The process according to claim 1, characterized in that the content of open-hearth lignite coke in the mixture with calcium hydroxide ranges from 1 to 15 wt. %.

6. The process according to claim 1, characterized in that the content of open-hearth lignite coke in the mixture with calcium hydroxide ranges from 2.5 to 10 wt. %.

7. The process according to claim 1, characterized in that the content of open-hearth lignite coke in the mixture with calcium hydroxide ranges from 3 to 10 wt. %.

* * * * *